No. 614,198. Patented Nov. 15, 1898.
D. BOORMAN, A. P. SHARP & J. O'NEIL.
APPARATUS FOR MELTING AND REMOVING SNOW.
(Application filed Dec. 1, 1897.)
(No Model.)
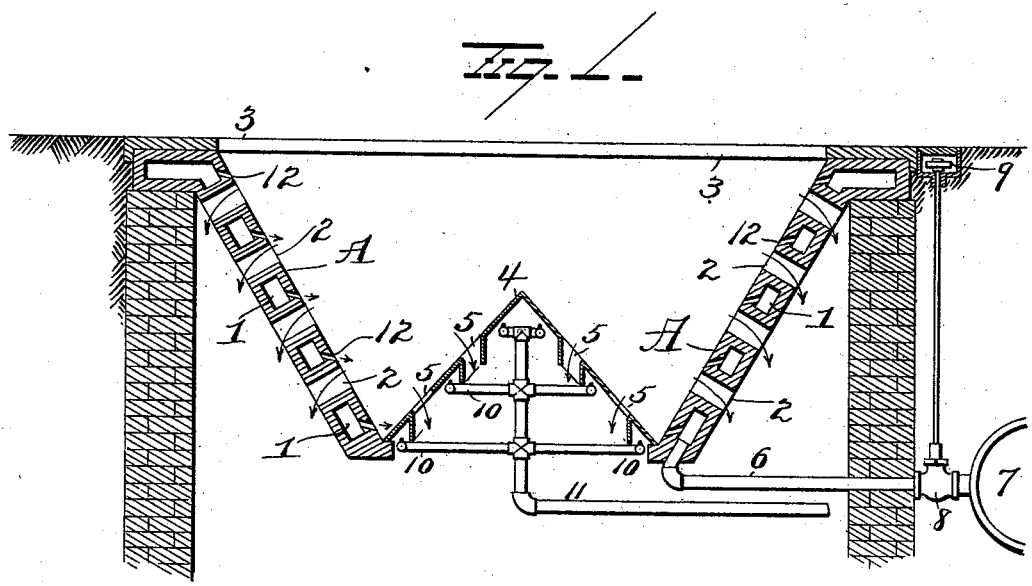
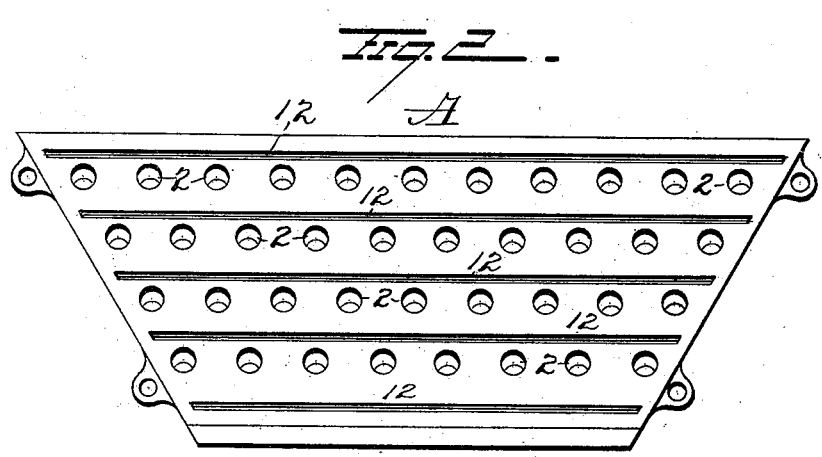
WITNESSES
E. J. Nottingham.
G. F. Downing.
INVENTORS
D. Boorman
A. P. Sharp
J. O'Neil
By H. A. Seymour, Attorney
THE NORRIS PETERS CO., PHOTO-LITHO., WASHINGTON, D. C.

UNITED STATES PATENT OFFICE.

DAVID BOORMAN, ALBERT P. SHARP, AND JOHN O'NEIL, OF ALTOONA, PENNSYLVANIA.

APPARATUS FOR MELTING AND REMOVING SNOW.

SPECIFICATION forming part of Letters Patent No. 614,198, dated November 15, 1898.

Application filed December 1, 1897. Serial No. 660,406. (No model.)

*To all whom it may concern:*

Be it known that we, DAVID BOORMAN, ALBERT P. SHARP, and JOHN O'NEIL, of Altoona, in the county of Blair and State of Pennsylvania, have invented certain new and useful Improvements in Apparatus for Melting and Removing Snow; and we do hereby declare the following to be a full, clear, and exact description of the invention, such as will enable others skilled in the art to which it appertains to make and use the same.

This invention relates to an improvement in apparatus for melting and removing snow, the object of the invention being to provide simple and efficient means for melting snow and carrying off the resulting slush and water from a street, alley, yard, house-top, or other exposed place.

With this object in view the invention consists in certain novel features of construction and combinations and arrangements of parts, as hereinafter set forth, and pointed out in the claims.

In the accompanying drawings, Figure 1 is a sectional view illustrating the invention. Fig. 2 is a detail view.

In the drawings we have illustrated our invention as applied for melting and carrying off melted snow from the surface of the ground to a sewer, but it is to be understood that our improvements are equally well adapted for melting snow on house-tops or any other exposed place where it can be connected with a sewer or other form of drainage and where water and heat, or both, can be had to operate the apparatus.

A represents a metal basin or receptacle having inclined sides. The sides or walls of the basin are made hollow to form a water-chamber 1, and through said chamber a number of outlets 2 extend transversely. In the drawings the basin is illustrated as located in the inlet of a sewer and is preferably covered with a removable grating 3, which serves to protect it when not in use. The bottom 4 of the basin or receptacle is preferably convex or tapering and projects upwardly thereinto. The said bottom is preferably made of sheet-copper and may be provided with outlets 5, through which slush and water can pass. The water-chamber 1 is connected by a pipe 6 with a water-main 7 or other water-supply, said pipe being provided with a valve 8, which can be readily operated by means of a key 9, having its head at or near the surface of the ground.

Burners 10 are disposed beneath the convex or tapering bottom of the basin and may be connected by a pipe 11 with the gas-main in the street or with any convenient source of fuel-supply. These burners will be protected from slush and water passing through the holes or outlets 5 by means of flanges or ears depending from the bottom 4, adjacent to said holes or outlets. The heat from the burners will serve to melt snow which enters the basin and also prevent the freezing of the apparatus, and the resulting slush and water will flow through the various outlets and enter the sewer, by which it will be carried off. We prefer, however, to augment the melting of the snow by flushing the basin with water, which is permitted to flow in a diagonal direction thereinto through inclined elongated outlets 12, communicating with the water-chamber. The water will flow forcibly and in considerable quantity into the basin and with the heat therein thoroughly reduce the snow to slush and water and permit it to readily escape from the basin through the various holes or outlets into the sewer, as above explained.

The operation of the apparatus is precisely the same whether it be placed in a street, alley, yard, on a house, or wherever it is capable of use.

Our improvements are simple in construction, are ready of application, and are effectual in all respects in the performance of their functions.

Various slight changes might be made in the details of construction of our invention without departing from the spirit thereof or limiting its scope, and hence we do not wish to limit ourselves in the precise details herein set forth.

Having fully described our invention, what we claim as new, and desire to secure by Letters Patent, is—

1. The combination with a receptacle having outlets and a bottom having perforations, of burners located under said bottom and flanges projecting from said bottom adjacent to the perforations, whereby to protect said burners, substantially as set forth.

2. The combination with a basin or receptacle adapted to receive snow and constructed to be supported in a sewer-opening, of means for flushing said basin through the depending walls thereof, and a heater projecting into said basin and adapted to operate simultaneously with the flushing means, substantially as set forth.

3. A snow-melting apparatus comprising a basin or receptacle having hollow inclined walls forming water-chambers, inclined elongated outlets or nozzles for said water-chambers and adapted to discharge into said basin or receptacle and outlets or holes extending transversely through said water-chambers, substantially as set forth.

4. The combination with a basin adapted to receive snow and having outlet-ducts, of a tapering bottom projecting upwardly into said basin, burners under said tapering bottom and means for supplying fuel to said burners, substantially as set forth.

5. The combination with a basin, of a tapering bottom projecting upwardly thereinto, said bottom having holes therein, flanges depending from the bottom adjacent to said holes and burners so disposed under said bottom as to be protected by said flanges, substantially as set forth.

In testimony whereof we have signed this specification in the presence of two subscribing witnesses.

DAVID BOORMAN.
    A. P. SHARP.
    JOHN O'NEIL.

Witnesses:
    D. STEEL,
    THEO. D. CRAWFORD.